(12) United States Patent
Sato et al.

(10) Patent No.: US 7,694,179 B2
(45) Date of Patent: Apr. 6, 2010

(54) SUSPECTED PLACE IDENTIFYING APPARATUS AND PROCESSING METHOD

(75) Inventors: Hiroaki Sato, Kawasaki (JP); Koji Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 469 days.

(21) Appl. No.: 11/492,073

(22) Filed: Jul. 25, 2006

(65) Prior Publication Data
US 2007/0217815 A1 Sep. 20, 2007

(30) Foreign Application Priority Data
Mar. 17, 2006 (JP) ............................ 2006-074062

(51) Int. Cl.
*G06F 11/30* (2006.01)
(52) U.S. Cl. ............................ 714/25; 714/42; 714/44; 714/26; 714/37; 714/40
(58) Field of Classification Search .................. 714/44, 714/40, 25, 37, 42, 26
See application file for complete search history.

(56) References Cited

U.S. PATENT DOCUMENTS

| | | | |
|---|---|---|---|
| 6,370,659 B1 * | 4/2002 | Maney ........................ 714/25 |
| 6,598,195 B1 * | 7/2003 | Adibhatla et al. ............ 714/745 |
| 6,625,745 B1 * | 9/2003 | Johnson et al. ................ 714/4 |
| 6,678,639 B2 * | 1/2004 | Little et al. .................. 702/188 |
| 7,096,387 B2 * | 8/2006 | Durrant et al. ................ 714/31 |
| 7,373,382 B2 * | 5/2008 | Nakai et al. .................. 709/206 |
| 2002/0056015 A1 * | 5/2002 | Nakai et al. .................... 710/18 |
| 2002/0104039 A1 * | 8/2002 | DeRolf et al. ................. 714/30 |
| 2002/0138791 A1 * | 9/2002 | Durrant et al. ................ 714/43 |
| 2002/0162045 A1 * | 10/2002 | Shiragaki ........................ 714/4 |
| 2002/0178404 A1 * | 11/2002 | Austen et al. .................. 714/43 |
| 2002/0191537 A1 * | 12/2002 | Suenaga ...................... 370/221 |
| 2005/0268161 A1 * | 12/2005 | Ackaret et al. ................. 714/6 |
| 2006/0085166 A1 * | 4/2006 | Ochi et al. ................... 702/186 |
| 2006/0230306 A1 * | 10/2006 | Richards et al. ................ 714/7 |
| 2007/0162782 A1 * | 7/2007 | Eickhoff et al. ................ 714/4 |

FOREIGN PATENT DOCUMENTS

| JP | 01-283644 | 11/1989 |
|---|---|---|
| JP | 06-175887 | 6/1994 |
| JP | 2003-271422 | 9/2003 |
| JP | 2005-182647 | 7/2005 |

* cited by examiner

*Primary Examiner*—Joshua A Lohn
*Assistant Examiner*—Chae Ko
(74) *Attorney, Agent, or Firm*—Staas & Halsey LLP

(57) ABSTRACT

A statistically added point calculation unit of the present invention statistically adds a point to a part related to a content of an anomaly in error information received by an error information receiving unit, and sets the added point in an added point table. A suspected place identifying unit refers to the added point table, and if the statistically added point of a target of determination has exceeded a threshold, the suspected place identifying unit identifies the target of the determination as a suspected place. If the configuration information table is referred to and a target of this process is a maintenance part at the suspected place, the suspected place identifying unit compares an initial value, for example, by means of the threshold which has been doubled. Furthermore, the suspected place identifying unit identifies a part having the statistically added point which is the next highest, as a second suspected place. A part isolation processing unit isolates the part at the suspected place. A configuration information management unit sets a second suspected place flag at the corresponding part in the configuration information table.

6 Claims, 8 Drawing Sheets

| PART MODULE ID | MODULE ADDED POINT |
|---|---|

FIG.2

| PART MODULE ID | STATUS | SECOND SUSPECTED FLAG |
|---|---|---|

FIG.3

SUSPECTED PLACE IDENTIFYING APPARATUS AND PROCESSING METHOD

CROSS-REFERENCE TO RELATED APPLICATIONS

This application claims priority from Japanese patent application Serial no. 2006-074062 filed Mar. 17, 2006, the contents of which are incorporated by reference herein.

BACKGROUND OF THE INVENTION

1. Field of the Invention

The present invention relates to a processing technology for identifying a place which is suspected of being a cause of an anomaly (hereinafter referred to as "suspected place") in the case where the anomaly has occurred in a computer system and the like. More particularly, the present invention relates to a processing technology for, after a part at the suspected place which has been identified statistically based on certain error information is replaced, if the same error information is notified again, identifying the suspected place or a place which is next estimated as the suspected place (hereinafter referred to as "second suspected place"). The present invention is practiced as, for example, a fault management of RAS control (control of Reliability, Availability and Serviceability) of the computer system.

2. Description of the Related Art

In a computer system, for example, if an anomaly occurs in a bus communication, it may not be possible to surely identify which side connected to a bus has a part having the cause. Thus, a process of identifying a suspected place statistically based on error information is performed. In this identifying process, a weighting is set which is added to each content of the anomaly or to each part, a predetermined weighting is added with respect to a place related to anomaly information in the error information which has been notified, and the place which has exceeded a predetermined threshold is identified as the suspected place. Then, a process of isolating the part at the suspected place is performed.

Moreover, as a fault monitoring/notifying method of Patent Document 1, there is a method of providing a predetermined threshold for each content of a fault in alarm information to be reported, reporting the content of the fault which has occurred more than or equal to a specified number of times of the threshold to an administrator, and performing determination of implementing a preventive maintenance, in a fault management of a network (Patent Document 1: Japanese Patent Laid-Open No. 6-175887).

However, in the process of identifying the suspected place statistically, a different part other than the part in which the anomaly has occurred actually may be identified. By using FIGS. 8A, 8B, and 8C, a problem in the process of identifying the suspected place statistically will be described.

As shown in FIG. 8A, control modules (CM) 907a and 907b are provided respectively on two buses between a part module (part M) 901 and a part module (part M) 903, which configure the computer system, and RAS control and the like are performed. It is assumed that the anomaly of the bus communication between the part module 903 and the control module 907a has been detected at the control module 907a. Here, it is assumed that there is the cause of the anomaly at the side of the control module 907a.

By a suspected place determination function, the predetermined weighting is added with respect to the part module 903, the control module 907a and the bus 905a respectively, based on the error information which has been notified by a communication driver, and if the added weighting has reached the predetermined threshold, the part is identified as the suspected place. For example, if the weighting of the part module 903 has reached the threshold, the part module 903 is identified as the suspected place.

Then, as shown in FIG. 8B, the part module 903 is isolated, and a part module 910 which is a new maintenance part is incorporated. However, if the part module 903 at the suspected place is isolated and the part module 910 is incorporated, since the part which has become the cause of the anomaly is not removed, the same error information is notified. Then, the similar process of statistically adding a point is performed, and the point is added to the weightings of the control module 907a and the part module 910 which are related to the anomaly, respectively in a similar fashion.

Thus, as shown in FIG. 8C, the same place is identified as the suspected place, and the part module 910 which has been newly incorporated becomes a target of the isolation process. Otherwise, in the process of incorporating the part module 910, the anomaly is detected in an access to the control module 907a, and the incorporation process fails.

In this way, in the case of identifying the suspected place statistically, since the same place is identified as the suspected place because the predetermined weighting is added thereto, the incorporated part module becomes the target of the isolation each time the same anomaly is detected, and a state occurs in which a part replacement is performed many times at the same place.

SUMMARY OF THE INVENTION

It is an object of the present invention to provide a suspected place identifying apparatus and a processing method thereof in which, in the case of determining a suspected place statistically and setting the suspected place as a target of a part isolation process, when the same anomaly is notified after incorporating a new maintenance part, it is possible to identify another suspected place considered as a cause of the anomaly.

If maintenance has been performed by isolating a part at the suspected place which has been identified statistically, the present invention raises a threshold of the suspected place determination with respect to this suspected place for a certain period. Accordingly, it becomes possible that another place which is likely to be the cause of the anomaly is identified as the suspected place. Hence, it is prevented that the isolation of the maintenance part which has been replaced is repeated, as a result of the same suspected place continuing to be identified with respect to the same anomaly, and it is possible to identify a place which is next likely to be the cause of the anomaly (second suspected place).

Thus, the present invention includes: 1) a configuration information table for storing configuration information related to parts configuring a system which is a maintenance target and the above described configuration; 2) an added point table for storing a statistically added point of each of the above described parts; 3) a statistically added point calculation unit for obtaining error information in the above described system, adding a predetermined point to a part related to the above described error and setting the added point in the above described added point table; 4) a suspected place identifying unit for, for each of the parts in the above described added point table, if the statistically added point of the above described part has exceeded a threshold, performing a process of identifying the above described part as a suspected place, and when the above described configuration information table is referred to and the above described part is a maintenance part incorporated at the above described suspected place, using a threshold for the suspected place, in which the above described threshold has been increased to a predetermined degree, to compare with the above described statistically added point; and 5) a configuration information management unit for setting suspected place information showing the part identified as the above described suspected place, in the above described configuration information table, based on a result of the process of identifying the above described suspected place.

The present invention includes the configuration information table for storing the configuration information related to the parts configuring the system which is the maintenance target and the configuration, and the added point table for storing the statistically added point of each of the parts. The statistically added point calculation unit obtains the error information in the system, adds the predetermined point to the part related to a content of the error, and sets the added point in the added point table. For each of the parts in the added point table, if the statistically added point of the part has exceeded the threshold, the suspected place identifying unit performs the process of identifying the part as the suspected place. In this case, if the configuration information table is referred to and a target of the above described process is the maintenance part incorporated at the suspected place, the suspected place identifying unit generates the threshold for the suspected place, in which the threshold has been increased to the predetermined degree, to compare with the above described statistically added point. After that, the configuration information management unit sets the suspected place information showing the part identified as the above described suspected place, in the configuration information table, based on a result of a process of determining the suspected place. For the suspected place information, for example, a status of the part, a suspected flag and the like are used. In this way, in the process of identifying the suspected place, by setting the threshold with respect to the maintenance part incorporated at the suspected place to a value which is larger than (for example, twice as large as) the threshold with respect to other part, the part at other than the suspected place which has been already identified becomes easier to be identified as the suspected place, when the same anomaly is notified.

Moreover, in the present invention, if there is the statistically added point which has exceeded the above described threshold in the above described added point table, the above described suspected place identifying unit identifies a part having the statistically added point which is the highest next to the above described statistically added point which exceeds the threshold, as a second suspected place, and the above described configuration information management unit sets second suspected place information showing the part identified as the above described second suspected place, in the above described configuration information table. By presenting the second suspected place which is likely to be the cause of the anomaly next to the suspected place, it is possible to perform preparation for the maintenance, calling attention to the second suspected place, when the maintenance is performed with respect to the suspected place.

Moreover, if a predetermined time has elapsed since a time point when the above described configuration information management unit has received a notification of completion of a process of incorporating the maintenance part with respect to the suspected place, the above described configuration information management unit deletes the second suspected place information which has been set in the configuration information table. It is because it becomes unnecessary to identify the second suspected place, since it is possible to determine that the isolation of the suspected place has been performed normally if the same anomaly does not occur within a certain time after completing the process of incorporating with respect to the suspected place.

Moreover, if the above described configuration information management unit has received the notification of the completion of the process of incorporating the maintenance part with respect to the second suspected place, the above described configuration information management unit deletes the second suspected place information which has been set in the configuration information table. It is because it becomes unnecessary to identify the second suspected place, since it is possible to determine that the maintenance with respect to the second suspected place has been performed normally, by receiving the notification of the completion.

Moreover, the present invention is a processing method of performing processing steps executed at each processing unit in the above described apparatus, by a computer. Alternatively, the present invention can be practiced as a program for causing the computer to execute the above described processes executed at each processing unit. The program for practicing the present invention can be stored in appropriate computer readable recording media such as a portable medium memory, a semiconductor memory, a hard disk and the like. And the program is recorded and provided in these recording media, or provided by sending and receiving it by means of various communication networks via a communication interface.

According to the present invention, if the suspected place has been identified statistically and the part at the suspected place has been replaced, it is possible to set only the threshold with respect to the suspected place at which the maintenance part has been incorporated to a high value, and loosen the determination of the suspected place, in the suspected place determination process which is executed in a certain period after completing the process of incorporating the new maintenance part. Accordingly, if the same anomaly is notified, it is possible to expect that a place other than the suspected place which has been already identified is newly identified. Hence, it is possible to prevent a state where the same suspected place is identified with respect to the same anomaly and the newly incorporated maintenance part becomes the target of the isolation process, from being repeated.

Moreover, since the newly identified suspected place is likely to be the cause of the anomaly, it is possible to execute an appropriate isolation process early, and expect an improvement in a maintenance performance of the system.

Moreover, according to the present invention, it is possible to identify the second suspected place together with the suspected place, and set the second suspected place in the configuration information table. If a maintenance administrator performs the maintenance with respect to the suspected place, it is possible for the maintenance administrator to comprehend the second suspected place where the maintenance may be required next, and expect to contemplate making a maintenance task such as preparation for the corresponding maintenance part or the like, more efficient.

BRIEF DESCRIPTION OF THE DRAWINGS

FIG. 2 is a diagram showing a data structure example of an added point table;

FIG. 3 is a diagram showing a data structure example of a configuration information table;

DETAILED DESCRIPTION OF THE PREFERRED EMBODIMENTS

Figure 1:
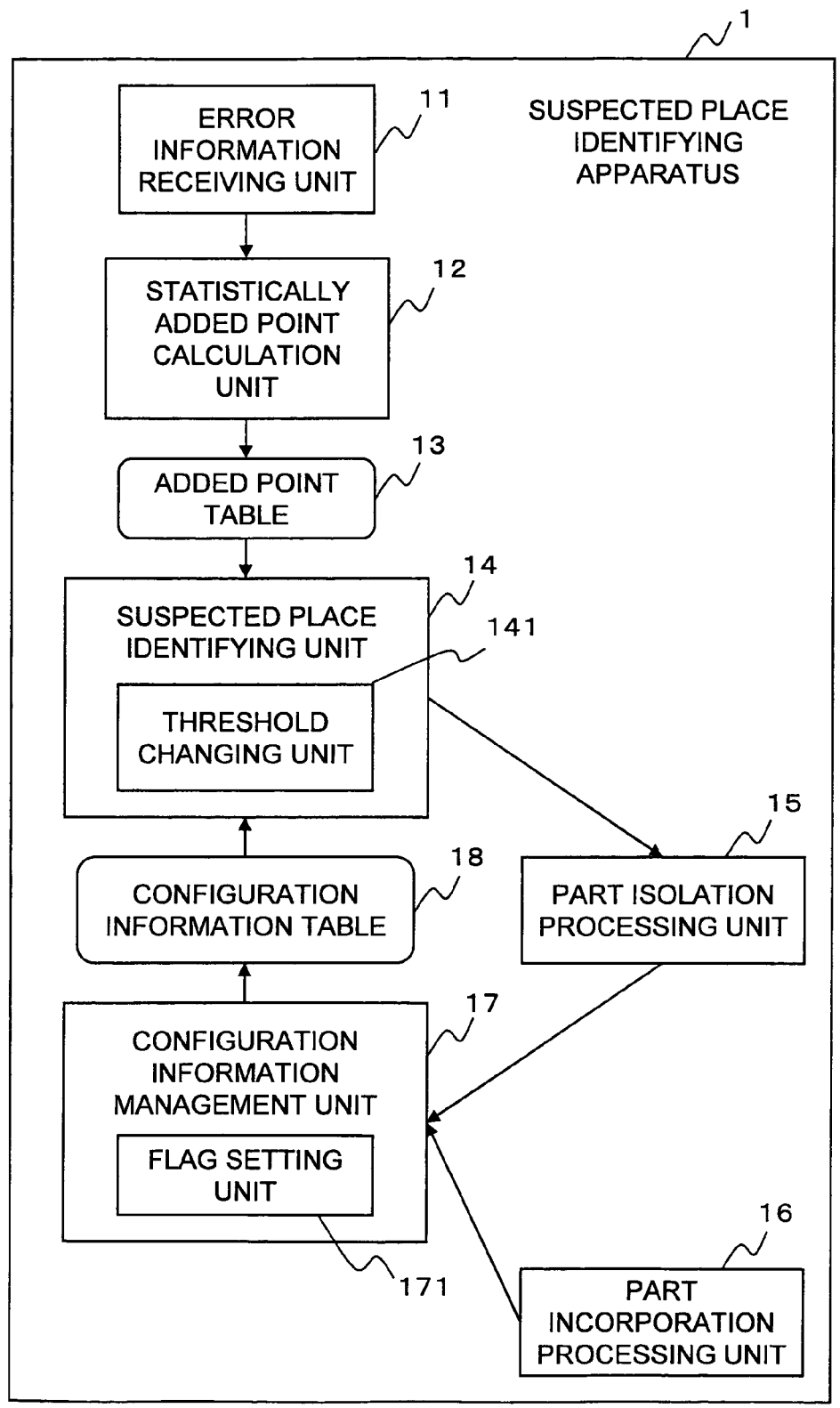
FIG. 1 is a diagram showing a configuration example in the best embodiment of the present invention.

FIG. 1 is a diagram showing a configuration example in the best embodiment of the present invention. In this embodiment, a suspected place identifying apparatus 1 according to the present invention is provided in a control module (CM) of a system which becomes a maintenance target. The suspected place identifying apparatus 1 is configured with an error information receiving unit 11, a statistically added point calculation unit 12, an added point table 13, a suspected place identifying unit 14 provided with a threshold changing unit 141, a part isolation processing unit 15, a part incorporation processing unit 16, a configuration information management unit 17 provided with a flag setting unit 171, and a configuration information table 18.

The added point table 13 is a storage unit for storing a statistically added point of each part. FIG. 2 shows a data structure example of a record in the added point table 13. In the added point table 13, with respect to all of part modules configuring the system, a part module ID for identifying the part module, and a module added point, which is an accumulation of the statistically added point which has been added with respect to that part, are stored. Here, the part module is a component of the part, which becomes a unit for isolation and incorporation processes.

The configuration information table 18 is a storage unit for storing configuration information of the part module of a computer system which is the maintenance target. FIG. 3 shows a data structure example of a record in the configuration information table 18. In the configuration information table 18, with respect to all of the part modules, the part module ID for identifying the part, a status, and a second suspected flag showing whether or not the part module has been identified as a second suspected place are stored.

The error information receiving unit 11 is processing means for obtaining error information showing an anomaly which has occurred in the system which is the maintenance target.

The statistically added point calculation unit 12 adds a predetermined statistically added point with respect to a related part module, based on the error information obtained by the error information receiving unit 11, and stores a result of the addition in the added point table 13. For the statistically added point, different values have been set for each content of the anomaly and each part module type, respectively.

The suspected place identifying unit 14 is processing means for, for each of the parts stored in the added point table 13, comparing its module added point with a predetermined threshold, and setting the part module having the statistically added point which has exceeded the threshold, as a suspected place.

The threshold changing unit 141 is processing means for referring to the configuration information table 18, and if a target of a process of identifying the suspected place is a maintenance part incorporated at the suspected place, increasing the threshold to a predetermined degree. For example, an initial value of the threshold is doubled. Specifically, the suspected place identifying unit 14 compares the module added point of each of the part modules stored in the added point table 13 with the predetermined threshold, and identifies the part which has exceeded the threshold, as the suspected place. In this case, if the part which is a target of determination is the maintenance part incorporated at the suspected place, the suspected place identifying unit 14 uses the threshold which has been changed at the threshold changing unit 141 to compare. Then if the module added point has exceeded the threshold, that part module is identified as the suspected place.

Furthermore, if there is the module added point which exceeds the threshold in the added point table 13, the suspected place identifying unit 14 identifies a part module having the module added point which is the next highest, as the second suspected place. The part module IDs which have been identified as the suspected place and the second suspected place are notified to the part isolation processing unit 15.

The part isolation processing unit 15 is processing means for performing a part isolation process with respect to the part module which has been notified as the suspected place.

The part incorporation processing unit 16 is processing means for performing a part incorporation process of the maintenance part with respect to the suspected place.

The configuration information management unit 17 is processing means for managing the configuration information table 18. When the part module ID which has been isolated as the suspected place is notified from the part isolation processing unit 15, the configuration information management unit 17 sets "failure" at the status of the corresponding part module in the configuration information table 18. Moreover, when failing of the part incorporation process with respect to the suspected place is notified from the part incorporation processing unit 16, the configuration information management unit 17 installs "warning" at the status of the part module in which the second suspected flag has been set. Moreover, when completion of the part incorporation process of the maintenance part with respect to the suspected place is notified, the configuration information management unit 17 obtains information related to the incorporated maintenance part and adds the information to the configuration information table 18.

The flag setting unit 171 is processing means for granting or deleting the second suspected flag in the configuration information table 18. When the part module ID which has been identified as the second suspected place is notified from the part isolation processing unit 15, the flag setting unit 171 sets a flag at the second suspected flag of the corresponding part module in the configuration information table 18.

Figure 4A:
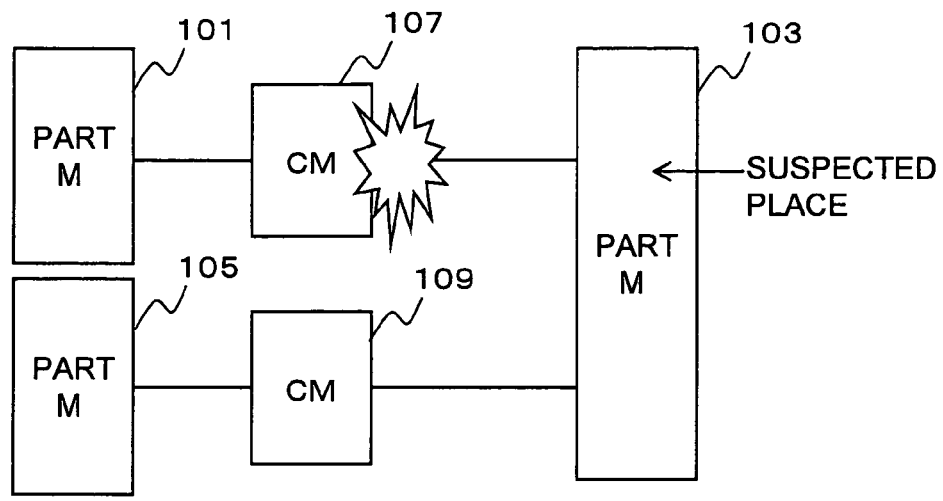
FIGS. 4A and 4B are diagrams for describing a process of the present invention.
Figure 4B:
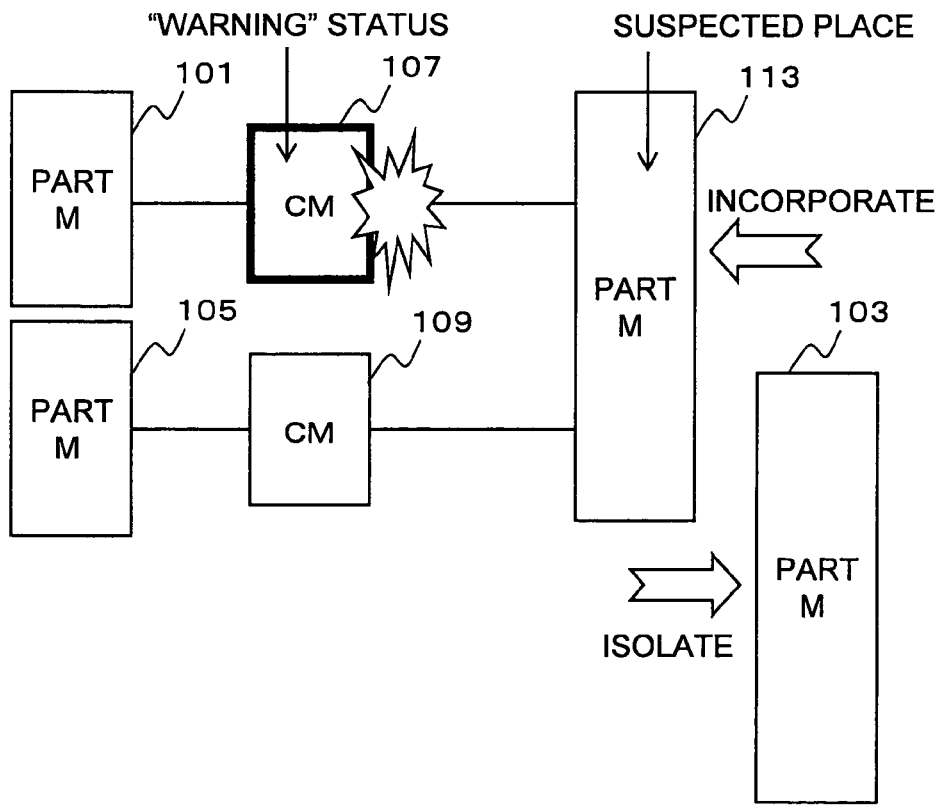

Hereinafter, the process of the present invention will be described. FIGS. 4A and 4B are diagrams showing a portion of a part module configuration in the computer system which is the target of the process by the suspected place identifying apparatus 1. It is assumed that part modules (M) 101, 103 and 105 configuring the system are connected respectively, for example, via PCI and the like, a control module (CM) 107 is provided between the part module 101 and the part module 103, and a control module (CM) 109 is provided between the part module 105 and the part module 103, respectively.

It is assumed that the anomaly has occurred in a communication between the control module 107 and the part module 103 in the system of FIG. 4A. It is assumed that there is a cause of the anomaly at the side of the control module 107. When the error information receiving unit 11 of the suspected place identifying apparatus 1 receives the error information from a communication driver, the statistically added point calculation unit 12 adds the predetermined statistically added point with respect to the part module 103 and the control module 107 which are related to the anomaly, based on the error information, and stores the added point in the added point table 13. From the content of the anomaly in the error information, it is assumed that the statistically added point with respect to the part module 103 is larger than the statistically added point with respect to the control module 107.

The threshold changing unit 141 refers to the configuration information table 18, and checks whether or not the second suspected flag has been set. Here, since the anomaly has newly occurred, and the second suspected flag has not been set in the configuration information table 18, the threshold changing unit 141 does not change the threshold. The suspected place identifying unit 14 determines whether or not the module added points of the part module 103 and the control module 107 exceed the threshold, from the added point table 13. If the module added point of the part module 103 has exceeded the threshold, the part module 103 is identified as the suspected place. Then, the control module 107 having the statistically added point which is the next highest is identified as the second suspected place.

As shown in FIG. 4B, the part isolation processing unit 15 performs the isolation process of the part module 103 which has been identified as the suspected place, and the part incorporation processing unit 16 performs the incorporation process of a part module 113 which is a replacement part. The configuration information management unit 17 sets the status of the part module 103 in the configuration information table 18 as "failure", and adds the part module 113 to the configuration information. Moreover, the configuration information management unit 17 sets the second suspected flag at the control module 107 in the configuration information table 18. Here, since the cause of the anomaly is the control module 107, the error information is notified also after the incorporation process of the part module 113 is terminated. The statistically added point calculation unit 12 similarly adds the statistically added point with respect to the part module 113 and the control module 107.

Referring to the configuration information table 18, since the second suspected flag has been set at the control module 107, the threshold changing unit 141 doubles the threshold of the part module 113. The suspected place identifying unit 14 uses the threshold which has been changed to be doubled, only with respect to the module added point of the part module 113 which is the maintenance part of the part module 103 identified as the suspected place, and performs a determination process. In the determination process with respect to the module added point of the control module 107, a normal threshold is used. As a result, the module added point of the part module 113 does not exceed the doubled threshold, and it is possible to expect that the module added point of the control module 107 has exceeded the threshold. Then, the suspected place identifying unit 14 identifies the control module 107 as the suspected place in this determination. The part isolation processing unit 15 performs the isolation process of the control module 107 which has been notified as the suspected place.

Or it is assumed that the incorporation process of the part module 113 which is the maintenance part of the part module 103 identified as the suspected place first, has failed. The part isolation processing unit 15 sends a request to change the status of the control module 107 which has been identified as the second suspected place, to the configuration information management unit 17. The configuration information management unit 17 changes the status of the control module 107 in the configuration information table 18 to "warning". As a result, it is possible for a maintenance administrator to know sooner the control module 107 which is likely to be identified as the suspected place next, from the setting in the configuration information table 18.

Figure 5:
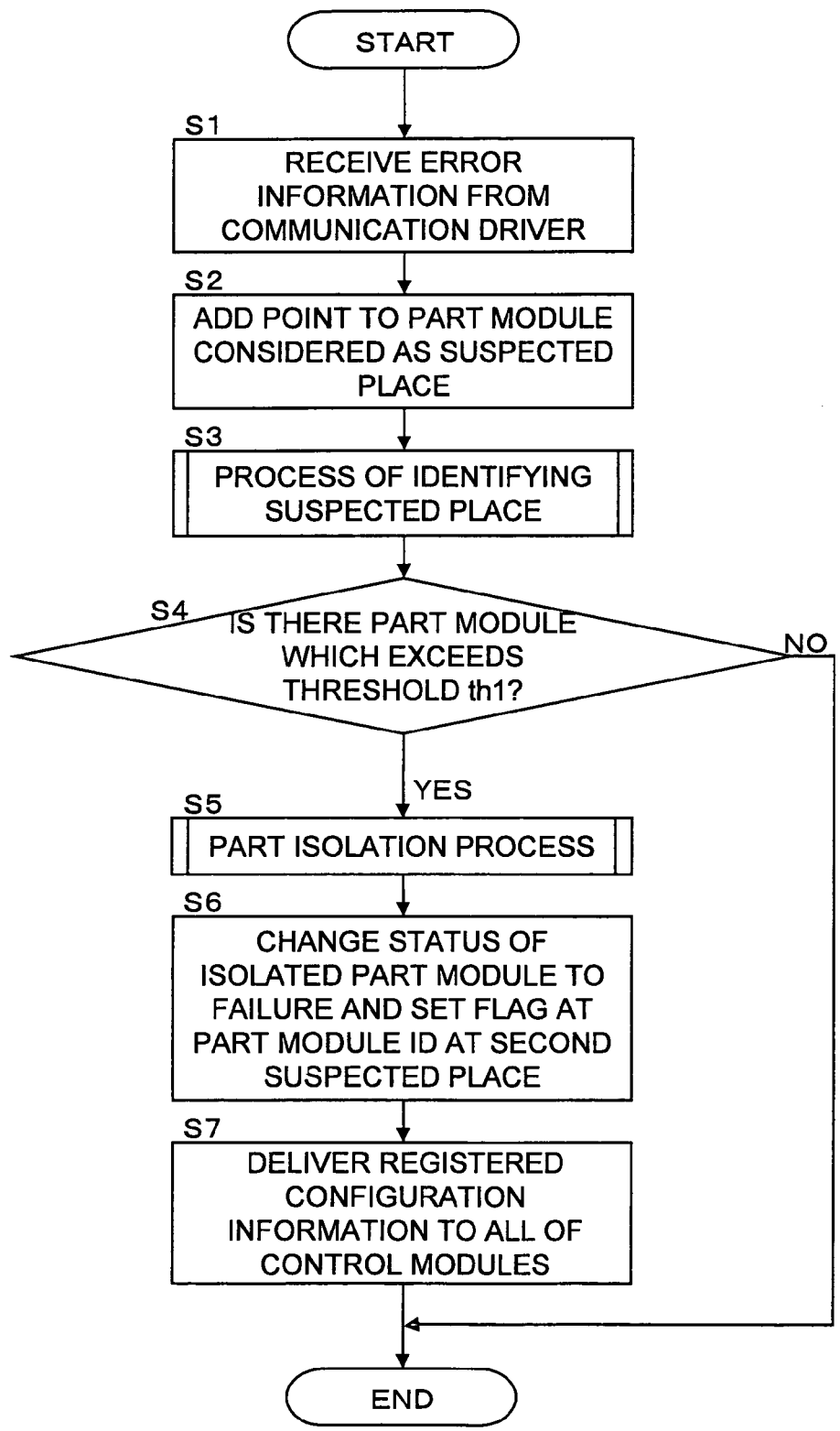
FIG. 5 is a diagram showing a process flow of a process of isolating a part module at a suspected place if a new error has been detected.
Figure 6:
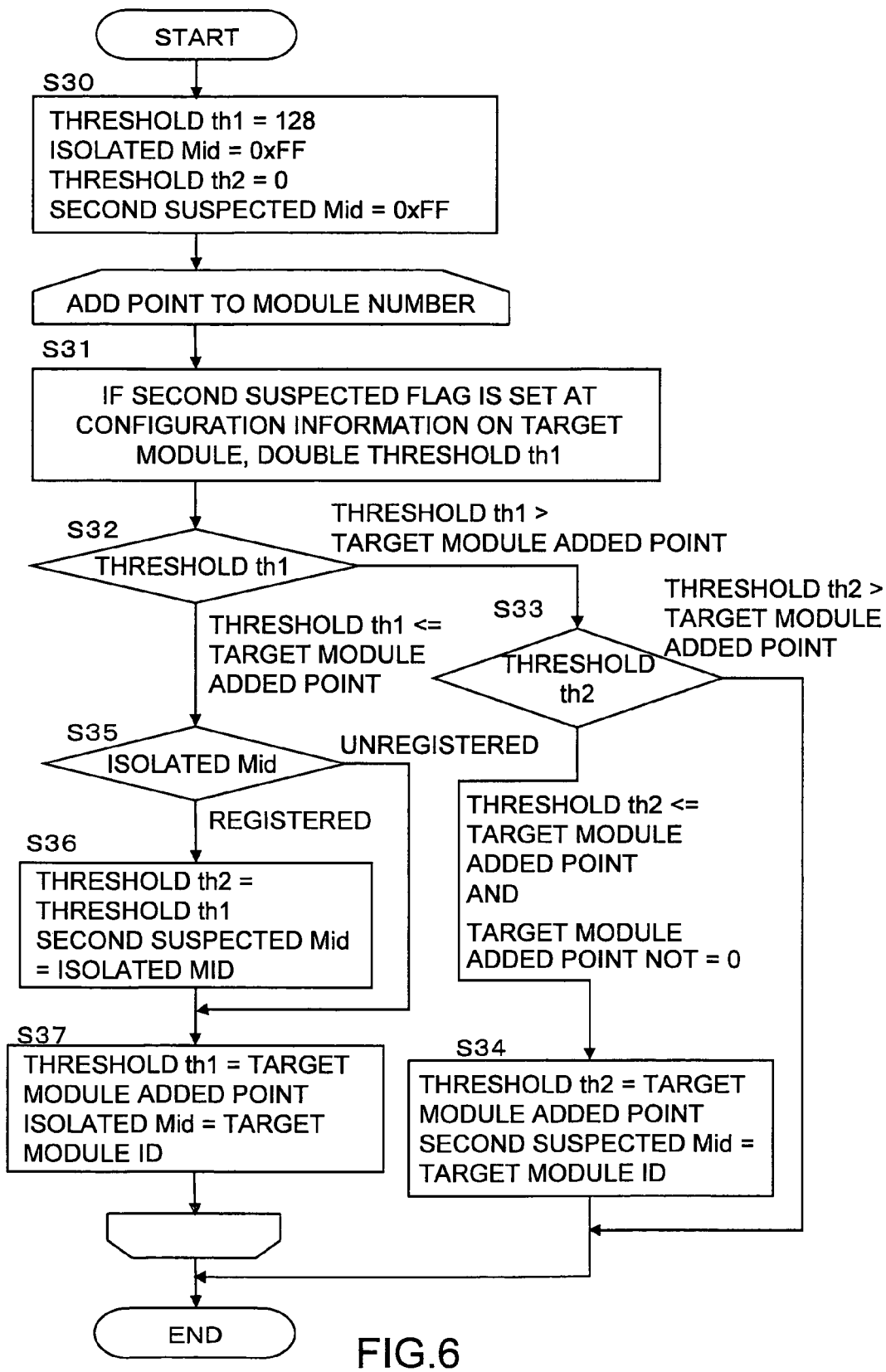
FIG. 6 is a diagram showing a process flow of a process of identifying the suspected place.
Figure 7:
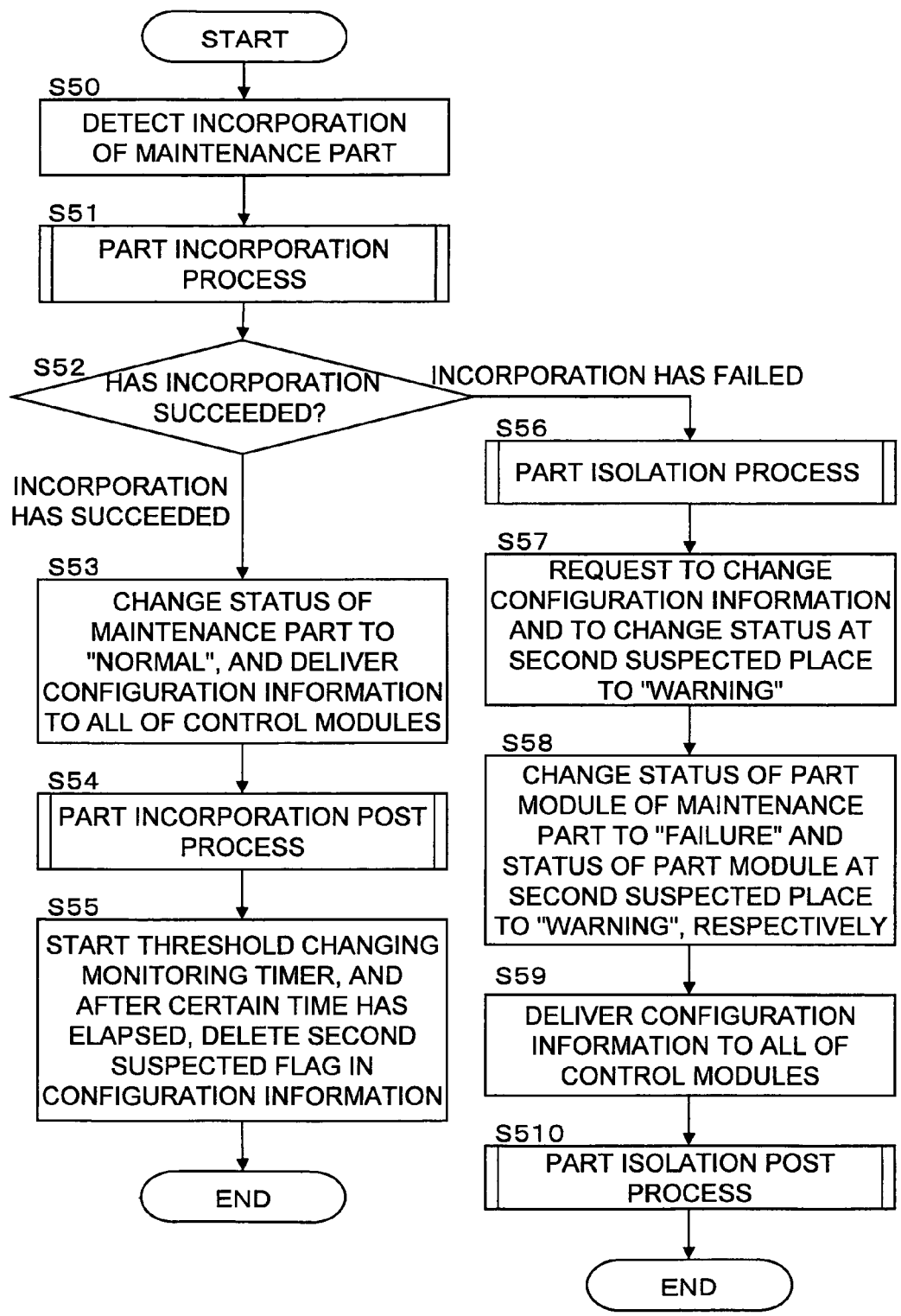
FIG. 7 is a diagram showing a process flow of a process of incorporating a maintenance part (new part module) at the suspected place.
Figure 8A:
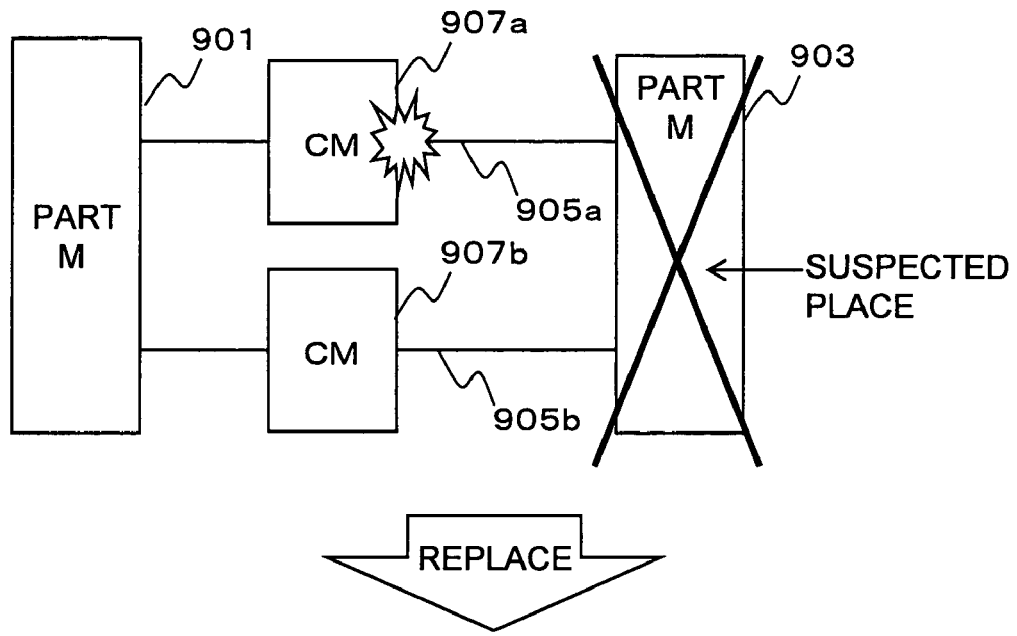
FIGS. 8A, 8B, 8C are diagrams for describing a problem in a process of identifying the suspected place statistically.
Figure 8B:
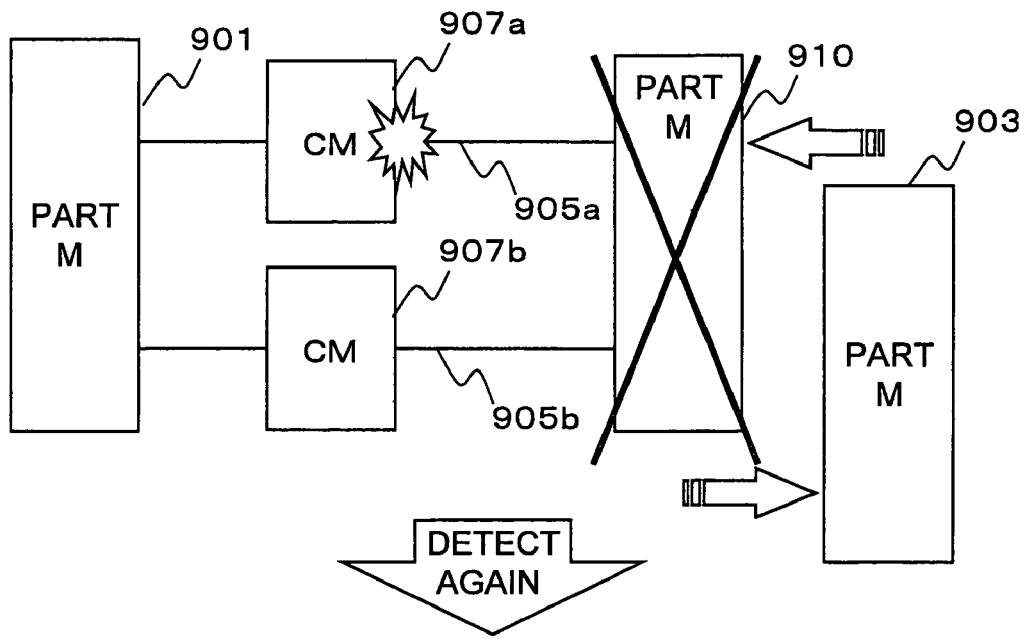
Figure 8C:
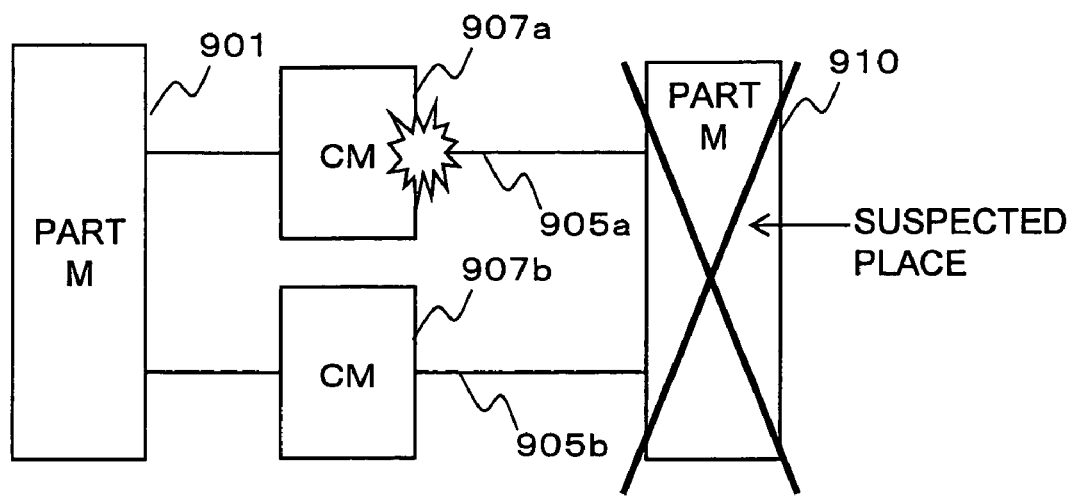

FIGS. 5 to 7 show process flow examples of the present invention. FIG. 5 is a diagram showing the process flow of the process of isolating the part module at the suspected place if a new error has been detected.

The error information receiving unit 11 of the suspected place identifying apparatus 1 receives the error information from the communication driver (step S1). The error information includes a content of the error, the part module ID of a communication partner, a communication route and the like. The statistically added point calculation unit 12 determines the part module related to the error based on the error information, and adds the predetermined statistically added point to the module added point of the corresponding part module in the added point table 13 (step S2). The suspected place identifying unit 14 performs the process of identifying the suspected place (step S3). The details of the process of identifying the suspected place will be described below.

In the process of identifying the suspected place, if there is the part module having the module added point which exceeds a threshold th1, the suspected place identifying unit 14 notifies the part isolation processing unit 15 of an isolation request (YES at step S4). The isolation request includes information on the part module ID which has been identified as the suspected place, an isolation factor (statistical value), the part module ID of the part module which has been identified as the second suspected place, if any, and the like. Receiving the isolation request, the part isolation processing unit 15 performs the part isolation process of the part module at the suspected place (step S5). Specifically, the part isolation processing unit 15 notifies the communication driver of a stoppage of the corresponding part module, and performs a process of resetting the part module on the hardware side, and the like. Furthermore, after isolating the part module at the suspected place, the part isolation processing unit 15 notifies the configuration information management unit 17 of the isolated part module ID, and the part module ID of the second suspected place. It should be noted that a host and the like may be notified of a part failure. The configuration information management unit 17 sets "failure" at the status of the corresponding part module in the configuration information table 18, based on the isolated part module ID.

Moreover, the flag setting unit 171 sets the second suspected flag at the corresponding part module ID in the configuration information table 18, based on the part module ID which has been identified as the second suspected place (step S6). The configuration information management unit 17 delivers the configuration information on the configuration information table 18 which has been updated, to all of the control modules (step S7).

FIG. 6 shows the process flow of the process of identifying the suspected place at step S3. As initial values, the suspected place identifying unit 14 sets "Threshold th1" =128 for determining the suspected place, "Isolated Mid" =0xFF, which is a variable for storing the part module ID which becomes a target of the isolation process, "Threshold th2" =0 for determining the second suspected place, and "Second Suspected Mid" =0xFF, which is a variable for storing the part module ID which is identified as the second suspected place (step S30).

Then, until the process of identifying the suspected place is completed with respect to all of the part modules configuring the system, the process of the following steps S31 to S37 is repeated. First, the threshold changing unit 141 refers to the configuration information table 18, and if the second suspected flag has been set at the configuration information on the part module which has become the target of the process of identifying the suspected place (hereinafter referred to as a target module), the threshold changing unit 141 doubles the Threshold th1 (=256) (step S31). The module added point of the target module (target module added point) and the Threshold th1 are compared (step S32). If the target module added point is smaller than the Threshold th1 (the Threshold th1>=the target module added point), the Threshold th2 and the target module added point are compared (step S33). If the target module added point is more than or equal to the Threshold th2 (the Threshold th2<=the target module added point) and the target module added point is not 0 (the target module added point ≠0), the target module added point is set to the Threshold th2, and the target module ID is stored in the Second Suspected Mid (step S34).

On the other hand, at the comparison process at step S32, if the target module added point is more than or equal to the Threshold th1 (the Threshold th1<=the target module added point), a value of the Isolated Mid is further checked (steps S35). If the module ID has been stored and already registered in the Isolated Mid (the Isolated Mid ≠0xFF), the Threshold th1 is set to the Threshold th2, and the value of the Isolated Mid is stored in the Second Suspected Mid (step S36). If the module ID has not been stored and registered in the Isolated Mid (the Isolated Mid=0xFF), the target module added point is set to the Threshold th1, and the target module ID is stored in the Isolated Mid (step S37). Then, if the process of steps S31 to S37 has been performed with respect to all target modules, the process is terminated.

As a result of the process, the suspected place identifying unit 14 identifies the target module ID (part module ID) stored in the Isolated Mid as the suspected place, and identifies the target module ID (part module ID) stored in the Second Suspected Mid as the second suspected place. If the target module ID has not been stored in the Isolated Mid, the second suspected place is not identified.

FIG. 7 is a diagram showing the process flow of the process of incorporating the maintenance part (new part module) at the suspected place. If the incorporation of the maintenance part is detected by an activation maintenance function and the like in a system control unit (step S50), the part incorporation processing unit 16 performs the part incorporation process (step S51). Specifically, the part incorporation processing unit 16 notifies the communication driver that the communication is possible, and performs a transcription of control information and the like.

The part incorporation processing unit 16 determines whether or not the part incorporation process has succeeded (step S52). If the part incorporation process has succeeded, the configuration information management unit 17 changes the status of the corresponding part module in the configuration information table 18 to "normal", and delivers the configuration information to all of the control modules (step S53). Furthermore, a predetermined part incorporation post process is performed (step S54). It should be noted that a known process may be performed in the part incorporation post process. When the flag setting unit 171 receives the notification of the completion of the part incorporation process, the flag setting unit 171 starts a threshold changing monitoring timer, and after a certain time (one hour) has elapsed, the flag setting unit 171 deletes the second suspected flag set in the configuration information table 18 (step S55).

On the other hand, at the process at step S52, if it is determined that the incorporation process of the maintenance part has failed, the part isolation processing unit 15 receives the notification of the failing of the incorporation, and performs the part isolation process (step S56). Then, the part isolation processing unit 15 notifies the configuration information management unit 17 of a request to change the configuration information in the configuration information table 18 and the request to change the status of the part module at which the second suspected flag has been set, to "warning" (step S57).

The configuration information management unit 17 changes the status of the incorporated part module in the configuration information table 18 to "failure", and sets "warning" to the status of the part module at which the second suspected flag has been set (step S58). Then, the configuration information management unit 17 delivers the configuration information to all of the control modules (step S59). After that, the part isolation processing unit 15 performs a predetermined part isolation post process (step S510).

Although the present invention has been described with its embodiment hereinabove, it is natural that various variations of the present invention are possible within the range of the gist of the present invention. For example, a process example has been described in which the "failure" status is used as suspected place information for identifying the suspected place, and the second suspected flag is set as the information showing the second suspected place, in the configuration information table 18. However, a data structure may be possible in which a suspected place flag is set as the suspected place information. In this case, the flag setting unit 171 performs setting of the suspected place flag.

Moreover, in a system provided with a plurality of control system units, the suspected place identifying apparatus is configured in each of the system control units. In this case, one suspected place identifying apparatus, as a master, manages the configuration information on all of the part modules, and delivers the configuration information to other system control units.

What is claimed is:
1. A suspected place identifying apparatus comprising:
a data storage for storing a configuration information table and an added point table;
the configuration information table for storing configuration information related to parts configuring a system which is a maintenance target and said configuration;
the added point table for storing a statistically added point of each of said parts;
a statistically added point calculator for obtaining error information in said system, adding a predetermined point to a part related to said error and setting the added point in said added point table;
a suspected place identifier for, for each of the parts in said added point table, if the statistically added point of said part has exceeded a threshold, performing a process of identifying said part as a suspected place, and when said configuration information table is referred to and said part is a maintenance part incorporated at said suspected place, using a threshold for the suspected place, in which said threshold has been increased to a predetermined degree, to compare with said statistically added point; and
a configuration information manager for setting suspected place information showing the part identified as said suspected place, in said configuration information table, based on a result of the process of identifying said suspected place;

wherein if there exists a statistically added point which exceeds said threshold in said added point table, said suspected place identifier identifies a part having a statistically added point that is the highest next to said exceeding statistically added point and association, in configuration, with said part having the exceeding statistically added point and both points having been calculated on said error information, and then sets said identified part as a second suspected place, said configuration information manager sets second suspected place information showing the part identified as said second suspected place, in said configuration information table, and said configuration information manager increases the threshold a second predetermined degree if the second suspected place information has been set and the incorporated maintenance part is identified as a suspected place due to an error that occurred at the suspected place.

2. The suspected place identifying apparatus according to claim 1, wherein if a predetermined time has elapsed since a time point when said configuration information manager has received a notification of completion of a process of incorporating the maintenance part with respect to said suspected place, said configuration information manager deletes said second suspected place information which has been set in said configuration information table.

3. The suspected place identifying apparatus according to claim 2, wherein if said configuration information manager has received the notification of the completion of the process of incorporating the maintenance part with respect to said second suspected place, said configuration information manager deletes said second suspected place information which has been set in said configuration information table.

4. The suspected place identifying apparatus according to claim 2, wherein if said configuration information manager has received a notification of failing of the process of incorporating the maintenance part with respect to said suspected place, said configuration information manager sets a warning at a status of the part related to the second suspected place information in said configuration information table.

5. A suspected place identifying processing method executed by a computer having a configuration information table for storing configuration information related to parts configuring a system which is a maintenance target and said configuration, and an added point table for storing a statistically added point of each of said parts, said processing method comprising:

a processing step of obtaining error information in said system, adding a predetermined point to a part related to said error and setting the added point in said added point table;

a processing step of, for each of the parts in said added point table, if the statistically added point of said part has exceeded a threshold, performing a process of identifying said part as a suspected place, and when said configuration information table is referred to and said part is a maintenance part incorporated at said suspected place, using a threshold for the suspected place, in which said threshold has been increased to a predetermined degree, to compare with said statistically added point; and a processing step of setting suspected place information showing the part identified as said suspected place, in said configuration information table, based on a result of the process of identifying said suspected place;

wherein if there exists a statistically added point which exceeds said threshold in said added point table, said suspected place identifier identifies a part having a statistically added point that is the highest next to said exceeding statistically added point and association, in configuration, with said part having the exceeding statistically added point and both points having been calculated on said error information, and then sets said identified part as a second suspected place, said configuration information manager sets second suspected place information showing the part identified as said second suspected place, in said configuration information table, and said configuration information manager increases the threshold a second predetermined degree if the second suspected place information has been set and the incorporated maintenance part is identified as a suspected place due to an error that occurred at the suspected place.

6. A suspected place identifying program product stored in a storage medium for causing a computer to execute:

a process of storing a configuration information table in which configuration information related to parts configuring a system which is a maintenance target and said configuration is stored;

a process of storing an added point table in which a statistically added point of each of said parts is stored;

a process of obtaining error information in said system, adding a predetermined point to a part related to said error and setting the added point in said added point table;

a process of, for each of the parts in said added point table, if the statistically added point of said part has exceeded a threshold, performing a process of identifying said part as a suspected place, and when said configuration information table is referred to and said part is a maintenance part incorporated at said suspected place, using a threshold for the suspected place, in which said threshold has been increased to a predetermined degree, to compare with said statistically added point; and a process of setting suspected place information showing the part identified as said suspected place, in said configuration information table, based on a result of the process of identifying the suspected place;

wherein if there exists a statistically added point which exceeds said threshold in said added point table, said suspected place identifier identifies a part having a statistically added point that is the highest next to said exceeding statistically added point and association, in configuration, with said part having the exceeding statistically added point and both points having been calculated on said error information, and then sets said identified part as a second suspected place, said configuration information manager sets second suspected place information showing the part identified as said second suspected place, in said configuration information table, and said configuration information manager increases the threshold a second predetermined degree if the second suspected place information has been set and the incorporated maintenance part is identified as a suspected place due to an error that occurred at the suspected place.

* * * * *